United States Patent
Tsirkin et al.

(10) Patent No.: US 11,748,140 B2
(45) Date of Patent: Sep. 5, 2023

(54) VIRTUAL MACHINE SECURITY POLICY IMPLEMENTATION

(71) Applicant: RED HAT, INC., Raleigh, NC (US)

(72) Inventors: Michael Tsirkin, Lexington, MA (US); Amnon Ilan, Raanana (IL)

(73) Assignee: Red Hat, Inc., Raleigh, NC (US)

( * ) Notice: Subject to any disclaimer, the term of this patent is extended or adjusted under 35 U.S.C. 154(b) by 240 days.

(21) Appl. No.: 17/008,293

(22) Filed: Aug. 31, 2020

(65) Prior Publication Data

US 2022/0066808 A1    Mar. 3, 2022

(51) Int. Cl.
*G06F 9/455* (2018.01)
*H04L 9/40* (2022.01)
*G06F 8/61* (2018.01)

(52) U.S. Cl.
CPC ............ *G06F 9/45558* (2013.01); *G06F 8/63* (2013.01); *H04L 63/0263* (2013.01); *H04L 63/20* (2013.01); *G06F 2009/45587* (2013.01)

(58) Field of Classification Search
CPC ... G06F 9/45558; G06F 8/63; H04L 63/0263; H04L 63/20
See application file for complete search history.

(56) References Cited

U.S. PATENT DOCUMENTS

| | | | | |
|---|---|---|---|---|
| 8,079,030 | B1 * | 12/2011 | Satish | H04L 63/20 718/1 |
| 9,300,640 | B2 | 3/2016 | Pate | |
| 10,645,123 | B1 * | 5/2020 | Vishwanathan | H04L 63/10 |
| 2009/0222880 | A1 * | 9/2009 | Mayer | G06F 21/604 718/1 |
| 2009/0307689 | A1 * | 12/2009 | Sudhakar | G06F 9/45558 718/1 |
| 2011/0154325 | A1 * | 6/2011 | Terasaki | G06F 9/455 718/1 |

(Continued)

OTHER PUBLICATIONS

Xi Xiong et al., "Practical Protection of Kernel Integrity for Commodity OS from Untrusted Extensions", https://s2.ist.psu.edu/paper/Liu-NDSS11.pdf, The Pennsylvania State University, 2011, 17 pages.

(Continued)

*Primary Examiner* — Benjamin C Wu
(74) *Attorney, Agent, or Firm* — Lowenstein Sandler LLP

(57) ABSTRACT

The technology disclosed herein enables a hypervisor to send a security policy to a virtual machine, which may use the security policy to validate system call invocations requested by a guest operating system. The system call invocations may be validated prior to being received by the hypervisor. The hypervisor may also validate system call invocations that are successfully validated by the virtual machine. An example method may include: identifying, by a hypervisor on a host machine, a security policy associated with a virtual machine, wherein the security policy specifies one or more validation rules, causing, by the hypervisor, the security policy to be imported into a guest operating system of the virtual machine from the hypervisor, and responsive to receiving, by the guest operating system, a first request to perform a system call, validating, by the guest operating system, the first request in accordance with the validation rules.

18 Claims, 5 Drawing Sheets

(56) References Cited

U.S. PATENT DOCUMENTS

| | | | |
|---|---|---|---|
| 2011/0271279 A1* | 11/2011 | Pate | G06F 9/45558 |
| | | | 718/1 |
| 2014/0096134 A1* | 4/2014 | Barak | G06F 21/566 |
| | | | 718/1 |
| 2017/0031692 A1* | 2/2017 | Oh | G06F 21/604 |
| 2017/0048249 A1* | 2/2017 | Berrangé | H04L 63/102 |
| 2018/0314846 A1 | 11/2018 | Schultz et al. | |
| 2019/0087575 A1* | 3/2019 | Sahita | G06F 21/71 |
| 2019/0155728 A1 | 5/2019 | Ferguson et al. | |
| 2019/0294779 A1 | 9/2019 | Suneja et al. | |
| 2020/0073691 A1* | 3/2020 | Tsirkin | H04L 63/105 |
| 2020/0344210 A1* | 10/2020 | Vijayvargiya | H04L 63/1408 |
| 2021/0152605 A1* | 5/2021 | Mizrahi | B60R 16/0231 |
| 2022/0114009 A1* | 4/2022 | Ismael | G06F 9/545 |

OTHER PUBLICATIONS

Jay Chen, "Making Containers More Isolated: An Overview of Sandboxed Container Technologies", https://unit42.paloaltonetworks.com/making-containers-more-isolated-an-overview-of-sandboxed-container-technologies/, Palo Alto Networks, Inc., Jun. 6, 2019, 14 pages.

Yathi Naik, "Hardening Docker Containers, Images, and Host—Security Toolkit". ttps://www.stackrox.com/post/2017/08/hardening-docker-containers-and-hosts-against-vulnerabilities-a-security-toolkit/, StackRox, Inc., Aug. 10, 2017, 9 pages.

* cited by examiner

VIRTUAL MACHINE SECURITY POLICY IMPLEMENTATION

TECHNICAL FIELD

The present disclosure is generally related to hardware virtualization, and more particularly, to improved security for virtual machine environments.

BACKGROUND

Virtualization herein shall refer to abstraction of some physical components into logical objects in order to allow running various software modules, for example, multiple operating systems, concurrently and in isolation from other software modules, on one or more interconnected physical computer systems. Virtualization allows, for example, consolidating multiple physical servers into one physical server running multiple virtual machines in order to improve the hardware utilization rate.

Virtualization may be achieved by running a software layer, often referred to as "hypervisor," above the hardware and below the virtual machines. A hypervisor may run directly on the server hardware without an operating system beneath it or as an application running under a traditional operating system. A hypervisor may abstract the physical layer and present this abstraction to virtual machines to use, by providing interfaces between the underlying hardware and virtual devices of virtual machines.

Processor virtualization may be implemented by the hypervisor scheduling time slots on one or more physical processors for a virtual machine, rather than a virtual machine actually having a dedicated physical processor. Memory virtualization may be implemented by employing a page table (PT) which is a memory structure translating virtual memory addresses to physical memory addresses. Device and input/output (I/O) virtualization involves managing the routing of I/O requests between virtual devices and the shared physical hardware.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
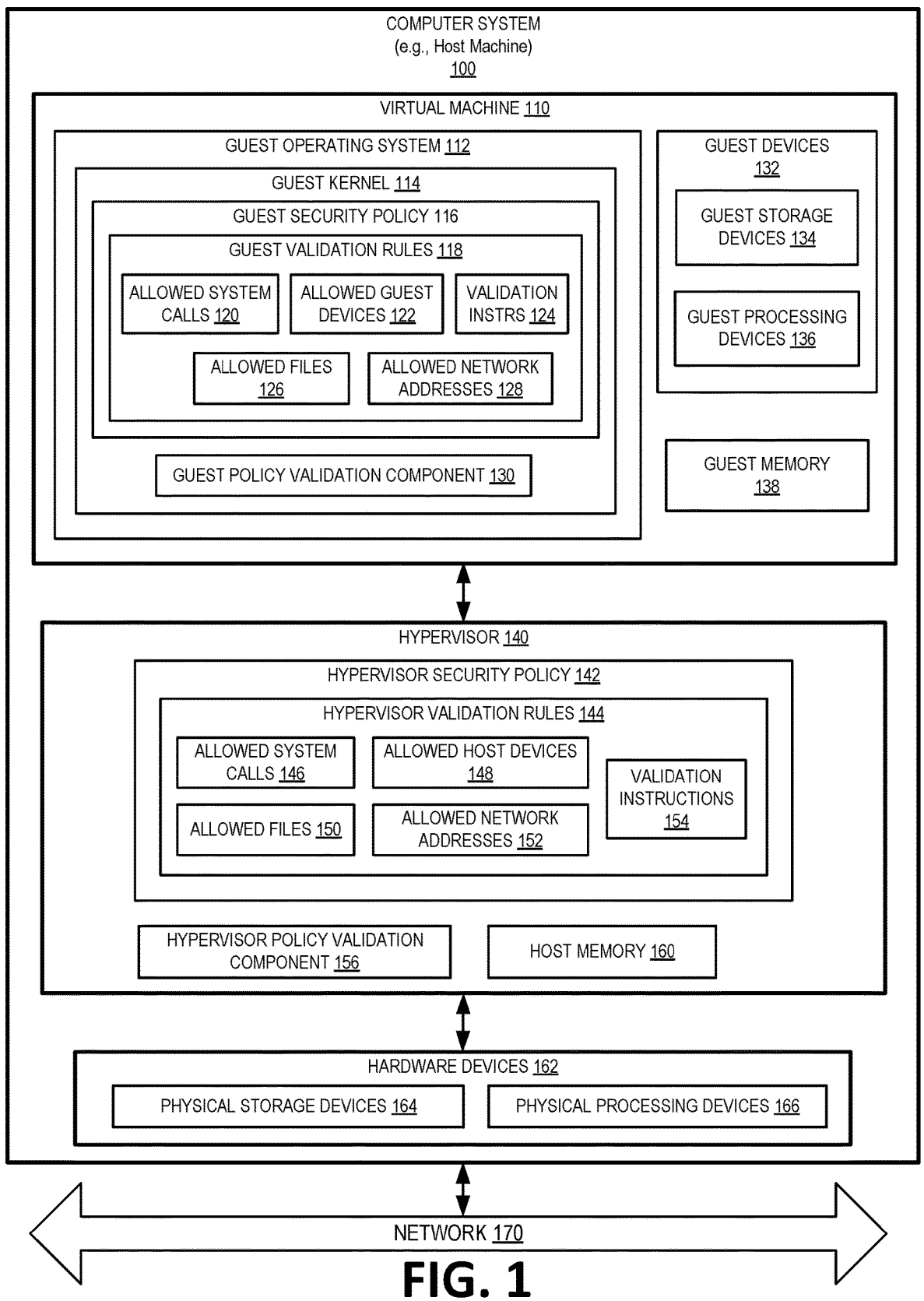
FIG. 1 depicts a high-level block diagram of an example host computer system in accordance with one or more aspects of the present disclosure.

A hypervisor may abstract a computer system's underlying hardware and present this abstraction to virtual machines to use, by providing interfaces between the underlying hardware and the virtual machines. The hypervisor may be implemented by executable code and may include vulnerabilities that enable a process executing within a virtual machine to modify executable data or informational data to gain privileges available to the hypervisor. The exploitation of a vulnerability is often referred to as an "attack," and the various points of attack may define the "attack surface." For example, a particular attack may involve exploiting a bug in a hypervisor's processing of a system call. The application may invoke the system call in a guest operating system running in a virtual machine to cause the hypervisor to perform the system call, at which point the application may gain privileges available to the hypervisor.

Aspects of the present disclosure address the above and other deficiencies by providing technology that enables a hypervisor to enforce a security policy upon a virtual machine, which then uses the security policy to validate system call invocations requested by a guest operating system. In an illustrative example, the security policy may be specified by a security policy configuration file including multiple security rules. Each security rule allows or denies access to a certain resource based on evaluating a specified condition (e.g., allows a guest application to invoke a certain system call if the parameter(s) of the system call fall within respective specified ranges). The security policy configuration file may be created by the hypervisor and injected into the virtual machine, e.g., during the virtual machine boot sequence. Upon completing the boot, the virtual machine's security component would utilize the configuration file for filtering the parameters of system calls, as described in more detail herein below. As an example, a workload may include an application that uses DPDK and performs network communication but no file operations need not be allowed to write to filesystems. Thus, write to files by the application cans be blocked to reduce the attack surface of the hypervisor and the guest operating system. The file writes can be blocked at the application's virtual machine by creating, at the hypervisor, a security policy that denies file write operations, and sending the security policy to the application's virtual machine. The operating system in the application's virtual machine enforces the security policy by discarding file write requests from the application.

System calls that involve hardware access may invoke the hypervisor (e.g., via a hypercall), and any vulnerabilities that exist in the hypervisor may be attacked via invocations of such system calls. The system call invocations may be validated prior to being received by the hypervisor, thereby reducing the attack surface of the hypervisor. The guest operating system kernel may be implemented by different program code from the hypervisor, and is thus unlikely to have the same vulnerabilities as the hypervisor.

The hypervisor may implement the next level of defense against attacks by, for example, filtering parameters of hypercalls, making particular file systems or devices read-only for invocations of system calls, and so on. For example, the hypervisor may validate system call invocations that have been successfully validated by the virtual machine. In this way, a vulnerability in one of these two components (the guest operating system or the hypervisor) cannot be successfully exploited by an attacker to gain privileges available to the hypervisor, since validation performed by the other of the two components does not have the vulnerability, and is sufficient to verify system call invocations that reach the hypervisor.

The security policies may specify particular operations, such as particular system calls, that the guest operating system is permitted to perform (for policies that deny all operations unless a permission is specified by a security rule) or is not permitted to perform (for policies that permit all operations unless an exclusion is specified by a security rule). The security policies may be enforced in the virtual machine by the guest operating system kernel, which may prevent the operations from being performed unless a security policy indicates that the operations are allowed. For example, the attack described above, which invokes a system call in a guest operating system, fails if the virtual machine in the guest operating system prevents the system call from being performed. The hypervisor may provide the guest operating system kernel to the virtual machine in addition to the security policies, e.g., to provide additional assurance that the guest operating system will enforce the security policies. The security policies may specify particular host devices to which access is to be allowed (or, alternatively, denied). The hypervisor may translate the security policies for the guest operating system, so that the security policies provided to the guest specify guest devices (e.g., virtual devices) that correspond to the host devices.

Various aspects of the above referenced methods and systems are described in details herein below by way of examples, rather than by way of limitation. The examples provided below discuss techniques for validating system calls in a guest operating system running in a virtual machine in accordance with a security policy received from a hypervisor.

FIG. 1 depicts an illustrative architecture of elements of a computer system 100, in accordance with an embodiment of the present disclosure. It should be noted that other architectures for computer system 100 are possible, and that the implementation of a computing device utilizing embodiments of the disclosure are not necessarily limited to the specific architecture depicted. Computer system 100 may be a single host machine or multiple host machines arranged in a cluster and may include a rackmount server, a workstation, a desktop computer, a notebook computer, a tablet computer, a mobile phone, a palm-sized computing device, a personal digital assistant (PDA), etc. In one example, computer system 100 may be a computing device implemented with x86 hardware. In another example, computer system 100 may be a computing device implemented with PowerPC®, SPARC®, or other hardware. In the example shown in FIG. 1, computer system 100 may include virtual machine 110, hypervisor 140, hardware devices 162, a network 170, and a Peripheral Component Interconnect (PCI) device 150.

Virtual machine 110 may execute guest executable code that uses an underlying emulation of the physical resources. The guest executable code may include a guest operating system 112, guest applications (not shown), guest device drivers (not shown), etc. Virtual machines 110 may support hardware emulation, full virtualization, para-virtualization, operating system-level virtualization, or a combination thereof. Virtual machine 110 may have the same or different types of guest operating systems, such as Microsoft®, Windows®, Linux®, Solaris®, etc. Virtual machine 110 may execute guest operating system 112 that includes guest kernel 114 and manages guest memory 138.

Guest kernel 114 may implement one or more guest security policies 116, which may be stored in guest memory 138, and may be used to validate requests for guest operating system 112 140 to perform operations. In an illustrative example, a guest security policy 116 or a hypervisor security policy 142 may be specified by a security policy configuration file including multiple validation rules 118. Each validation rule 118 allows or denies access to a certain resource based on evaluating a specified condition (e.g., allows a guest application to invoke a certain system call if the parameter(s) of the system call fall within respective specified ranges).

Guest security policies 116 may be received from hypervisor 140. The security policy configuration file may be created by the hypervisor 140 and injected into the virtual machine 110, e.g., during the virtual machine 110 boot sequence. Upon completing the boot, the virtual machine's security component would utilize the configuration file for filtering the parameters of system calls, as described in more detail herein below. A script that is executable by the virtual machine 110 may be loaded from a storage device during virtual machine boot time. The script may have a line referencing the security policy configuration file, and the guest security policy.

In another example, the guest security policy 116 (and hypervisor security policy 142) may be loaded sent from the hypervisor 140 to the virtual machine 110 through a virtual device. During a boot process, the guest operating system 112 may request the hypervisor security policy 142 from the hypervisor 140, and the hypervisor 140 may send the security policy to the guest operating system 112 via a virtual device that provides communication between the hypervisor 140 and the guest operating system 112. The guest operating system 112 may request the security policy 142 during an early user space boot stage. The guest operating system kernel 114 may begin its boot process. By loading the security policy 142 early in the boot process, the hypervisor 140 can enforce the use of the security policy 142 by the guest operating system.

Although guest security policy 116 is shown and described as being included in (e.g., managed by) guest kernel 114, guest security policy 116 may alternatively or additionally be included in guest operating system outside of guest kernel 114. Guest kernel 114 may also include a guest policy validation component 130, which may validate a request for the guest operating system 112 to perform an operation such as a system call. The request may be validated by evaluating one or more guest validation rules 118 of a guest security policy 116. If the validation rules 117 are satisfied by the request, then the request is successfully validated and may be performed by the guest operating system 112. If the validation rules 118 are not satisfied by the request, then the request is not successfully validated, and may not be performed by the guest operating system 112. Performing validation of requests using guest policy validation component 130 in the virtual machine 110 is efficient, since there is no need to call out to the hypervisor 140 to determine whether to allow the request. Since system call validation does not require an exit from the virtual machine 110 to communicate with the hypervisor 140, the performance overhead of the validation is minimal.

A security policy 116 may specify that all operations are to be denied by default, and validation rules 118 specify the particular operations that are allowed. For example, a policy may specify that all outgoing network connections are disabled except for connections to a specified network address. Another type of security policy may specify that all operations are to be allowed by default, and validation rules 118 specify the particular operations that are allowed. For example, a policy may specify that all accesses to file systems are allowed except for accesses to a specified file system.

Each guest security policy 116 may include one or more guest validation rules 118. Each guest validation rule 118 may specify one or more condition-related criteria 120, 122, 126, 128 or instructions 124 that can be used to determine whether a request to perform an operation (such as a system call) is valid. The condition-related criteria may include a set of allowed system calls 120, each of which may specify a system call identifier (e.g., a numeric identifier) and one or more optional policy parameter values. If parameter values are specified, then an invocation of the system call identified by the system call identifier may be performed if the parameters specified in the invocation correspond to (e.g., match or are equal to) the policy parameter values. The allowed guest devices 122 specify one or more guest devices 132, such as storage devices (e.g., disks) or network devices (e.g., network interfaces), or guest processing devices 136, that requests are allowed to access. As an example, if the allowed guest devices 122 specify a disk named "VDisk0" then a request to perform an operation that accesses "VDisk0" may be allowed, regardless of whether other validation rules 118 are satisfied by the request. Alternatively, a request may be allowed only if all validation rules 118 that are specified in the security policy 116 are satisfied by the request. For example, a request may be allowed if both an allowed system call 120, (e.g., read), and an allowed guest device 122 (e.g., "VDisk0") are satisfied.

One or more allowed files 126 may be specified in a validation rule 118, in which case a request to access a file is allowed if the requested file is present in the set of allowed files 150. The allowed files 126 can be specified as file names, file descriptors, or other suitable file identifiers. One or more allowed network addresses 128 may be specified in a validation rule, in which case a request to communicate with a network host is allowed if the address of the network host is present in the allowed network addresses 128. The allowed network addresses 128 can be specified as host names or Internet Protocol (IP) addresses, for example. One or more validation instructions 124 may be specified in a validation rule 1, in which case a request to perform an operation (such as a system call) may be allowed if executing the validation instructions 124 generates a result indicating that the operation is allowed, or otherwise allow the operation. The validation instructions may be, for example, Berkeley Packet Filter machine language, or the like.

Guest memory 138 may be any virtual memory, logical memory, physical memory, other portion of memory, or a combination thereof for storing, organizing, or accessing data. Guest memory 138 may represent the portion of memory that is designated by hypervisor 140 for use by virtual machine 110. Guest memory 138 may be managed by guest operating system 112 and may be segmented into guest pages. The guest pages may each include a contiguous or non-contiguous sequence of bytes or bits and may have a page size that is the same or different from a memory page size used by hypervisor 140. Each of the guest page sizes may be a fixed-size, such as a particular integer value (e.g., 4 KB, 2 MB) or may be a variable-size that varies within a range of integer values. In one example, the guest pages may be memory blocks of a volatile or non-volatile memory device and may each correspond to an individual memory block, multiple memory blocks, or a portion of a memory block.

Host memory 160 (e.g., hypervisor memory) may be the same or similar to the guest memory but may be managed by hypervisor 140 instead of a guest operating system. Host memory 160 may include host pages, which may be in different states. The states may correspond to unallocated memory, memory allocated to guests, and memory allocated to hypervisor. The memory allocated to guests may be a portion of host memory 124 that has been allocated by hypervisor 140 to virtual machine 110 and corresponds to guest memory 138. Other portions of hypervisor memory may be allocated for use by hypervisor 140, a host operating system, hardware device, other module, or a combination thereof.

Hypervisor 140 may also be known as a virtual machine monitor (VMM) and may provide virtual machine 110 with access to one or more features of the underlying hardware devices 162. In the example shown, hypervisor 140 may run directly on the hardware of computer system 100 (e.g., bare metal hypervisor). In other examples, hypervisor 140 may run on or within a host operating system (not shown). Hypervisor 140 may manage system resources, including access to hardware devices 162.

Hypervisor 140 may include one or more hypervisor security policies 142, which may be stored in host memory 160, and may be used to validate requests for hypervisor 140 to perform operations. Further, hypervisor 140 may provide hypervisor security policies 142 to virtual machine 110. For example, hypervisor 140 may translate a hypervisor security policy 142 to form a guest security policy 116. Translating the policy may involve mapping hardware devices 162 referenced by the hypervisor security policy 142 to guest devices 132 (which may be virtual devices that represent hardware devices 162 in the virtual machine 110).

The hypervisor may implement the next level of defense against attacks by, for example, filtering parameters of hypercalls, making particular file systems or devices read-only for invocations of system calls, and so on. Hypervisor 140 may include a hypervisor policy validation component 156, which may validate a request for the hypervisor 140 to perform an operation such as a system call. The request may be validated by evaluating one or more hypervisor validation rules 144 of a hypervisor security policy 142. If the validation rules 144 are satisfied by the request, then the request is successfully validated and may be performed by the hypervisor 140. If the validation rules 144 are not satisfied by the request, then the request is not successfully validated, and may not be performed by the hypervisor 140.

Each hypervisor security policy 142 may include one or more hypervisor validation rules 144, which are similar to the guest validation rules 118, but reference hypervisor resources, such as physical hardware devices 162 instead of guest devices 132. Each hypervisor validation rule 144 may specify one or more condition-related criteria 145, 148, 150, 152 or instructions 154 that can be used to determine whether a request to perform an operation (such as a system call) is valid. The condition-related criteria may include a set of allowed system calls 146, each of which may specify a system call identifier (e.g., a numeric identifier) and one or more optional policy parameter values. If parameter values are specified, then an invocation of the system call identified by the system call identifier may be performed if the parameters specified in the invocation correspond to (e.g., match or are equal to) the policy parameter values. The allowed host devices 148 specify one or more host devices, e.g., hardware devices 162 such as storage devices 164 (e.g., disks), network devices (e.g., network interfaces), or physical processing devices 166 that requests are allowed to access. As an example, if the allowed host devices 148 specify a disk named "Disk0" then a request to perform an operation that accesses "Disk0" may be allowed, regardless of whether other validation rules 144 are satisfied by the request. Alternatively, a request may be allowed only if all validation rules 144 that are specified in the security policy 142 are satisfied by the request. For example, a request may be allowed if both an allowed system call 146, (e.g., read), and an allowed host device 148 (e.g., "Disk0") are satisfied.

One or more allowed files 150 may be specified in a validation rule 144, in which case a request to access a file is allowed if the requested file is present in the set of allowed files 150. The allowed files 150 can be specified as file names, file descriptors, or other suitable file identifiers. One or more allowed network addresses 152 may be specified in a validation rule, in which case a request to communicate with a network host is allowed if the address of the network host is present in the allowed network addresses 152. The allowed network addresses 152 can be specified as host names or Internet Protocol (IP) addresses, for example. One or more validation instructions 154 may be specified in a validation rule 144, in which case a request to perform an operation (such as a system call) may be allowed if executing the validation instructions 154 generates a result indicating that the operation is allowed, or otherwise allow the operation. The validation instructions may be, for example, Berkeley Packet Filter machine language, or the like.

Hardware devices 162 may provide hardware resources and functionality for performing computing tasks. Hardware devices 162 may include one or more physical storage devices 164, one or more physical processing devices 166, other computing devices, or a combination thereof. One or more of hardware devices 162 may be split up into multiple separate devices or consolidated into one or more hardware devices. Some of the hardware device shown may be absent from hardware devices 162 and may instead be partially or completely emulated by executable code.

Physical storage devices 164 may include any data storage device that is capable of storing digital data and may include volatile or non-volatile data storage. Volatile data storage (e.g., non-persistent storage) may store data for any duration of time but may lose the data after a power cycle or loss of power. Non-volatile data storage (e.g., persistent storage) may store data for any duration of time and may retain the data beyond a power cycle or loss of power. In one example, physical storage devices 164 may be physical memory and may include volatile memory devices (e.g., random access memory (RAM)), non-volatile memory devices (e.g., flash memory, NVRAM), and/or other types of memory devices. In another example, physical storage devices 164 may include one or more mass storage devices, such as hard drives, solid state drives (SSD)), other data storage devices, or a combination thereof. In a further example, physical storage devices 164 may include a combination of one or more memory devices, one or more mass storage devices, other data storage devices, or a combination thereof, which may or may not be arranged in a cache hierarchy with multiple levels.

Physical processing devices 166 may include one or more processors that are capable of executing the computing tasks. Physical processing devices 166 may be a single core processor that is capable of executing one instruction at a time (e.g., single pipeline of instructions) or may be a multi-core processor that simultaneously executes multiple instructions. The instructions may encode arithmetic, logical, or I/O operations. In one example, physical processing devices 166 may be implemented as a single integrated circuit, two or more integrated circuits, or may be a component of a multi-chip module (e.g., in which individual microprocessor dies are included in a single integrated circuit package and hence share a single socket). A physical processing device may also be referred to as a central processing unit ("CPU").

Network 170 may be a public network (e.g., the internet), a private network (e.g., a local area network (LAN), a wide area network (WAN)), or a combination thereof. In one example, network 170 may include a wired or a wireless infrastructure, which may be provided by one or more wireless communications systems, such as a wireless fidelity (WiFi) hotspot connected with the network 170 and/or a wireless carrier system that can be implemented using various data processing equipment, communication towers, etc.

Figure 2:
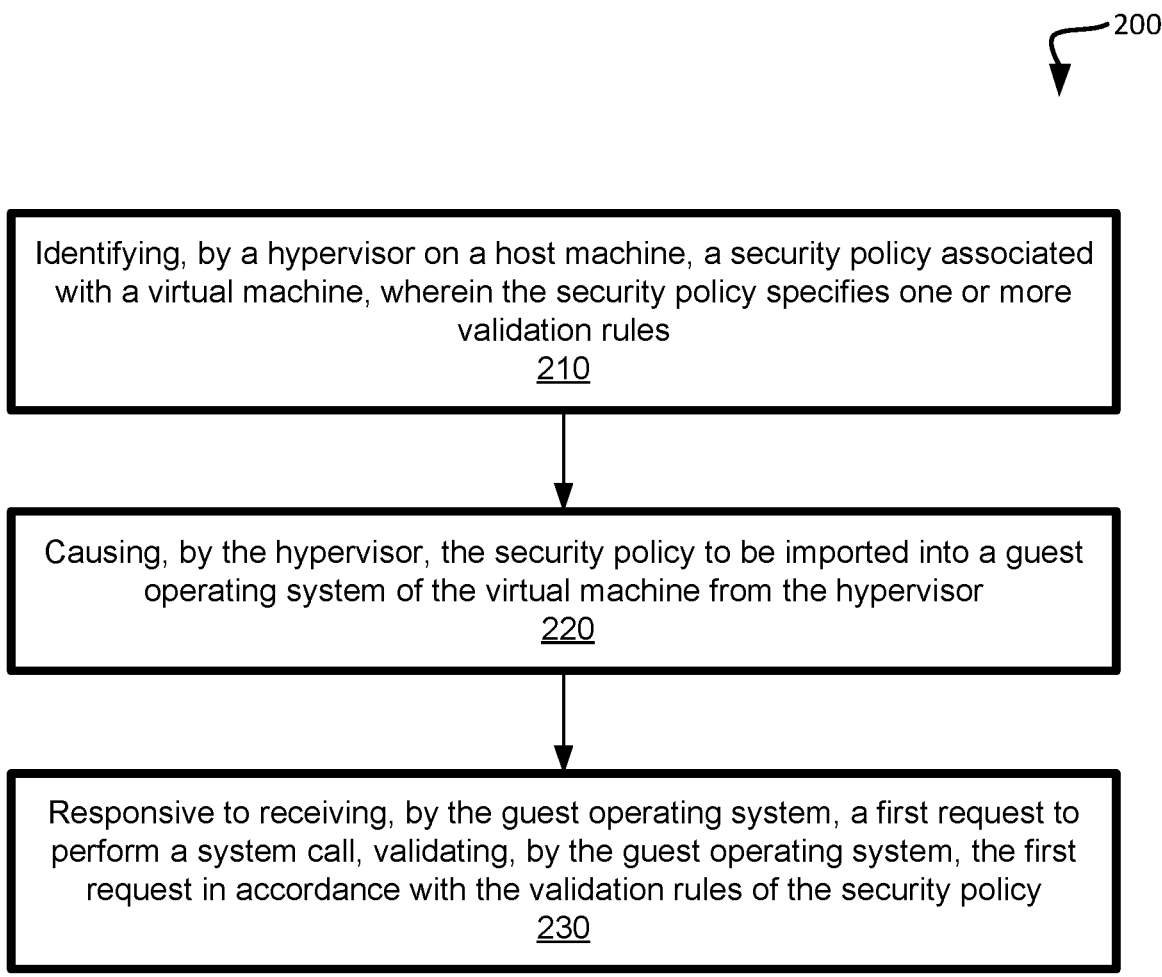
FIG. 2 depicts a flow diagram of an example method for validating system call invocations in a virtual machine using a security policy provided by a hypervisor, in accordance with one or more aspects of the present disclosure.

FIG. 2 depicts a flow diagram of an illustrative example of a method 200 for validating system call invocations in a virtual machine using a security policy provided by a hypervisor, in accordance with one or more aspects of the present disclosure. Method 200 and each of its individual functions, routines, subroutines, or operations may be performed by one or more processors of the computer device executing the method. In certain implementations, method 200 may be performed by a single processing thread. Alternatively, method 200 may be performed by two or more processing threads, each thread executing one or more individual functions, routines, subroutines, or operations of the method. In an illustrative example, the processing threads implementing method 200 may be synchronized (e.g., using semaphores, critical sections, and/or other thread synchronization mechanisms). Alternatively, the processes implementing method 200 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 200 may be performed by a kernel of a hypervisor as shown in FIG. 1 or by an executable code of a host machine (e.g., host operating system or firmware), a virtual machine (e.g., guest operating system or virtual firmware), an external device (e.g., a PCI device), other executable code, or a combination thereof.

Method 200 may be performed by processing devices of a server device or a client device and may begin at block 210. At block 210, a host computer system may identify, by a hypervisor on a host machine, a security policy associated with a virtual machine, wherein the security policy specifies one or more validation rules. At block 220, the host computer system may cause, by the hypervisor, the security policy to be imported into a guest operating system of the virtual machine from the hypervisor. At block 230, the host computer system may, responsive to receiving, by the guest operating system, a first request to perform a system call, validating, by the guest operating system, the first request in accordance with the validation rules of the security policy.

Figure 3:
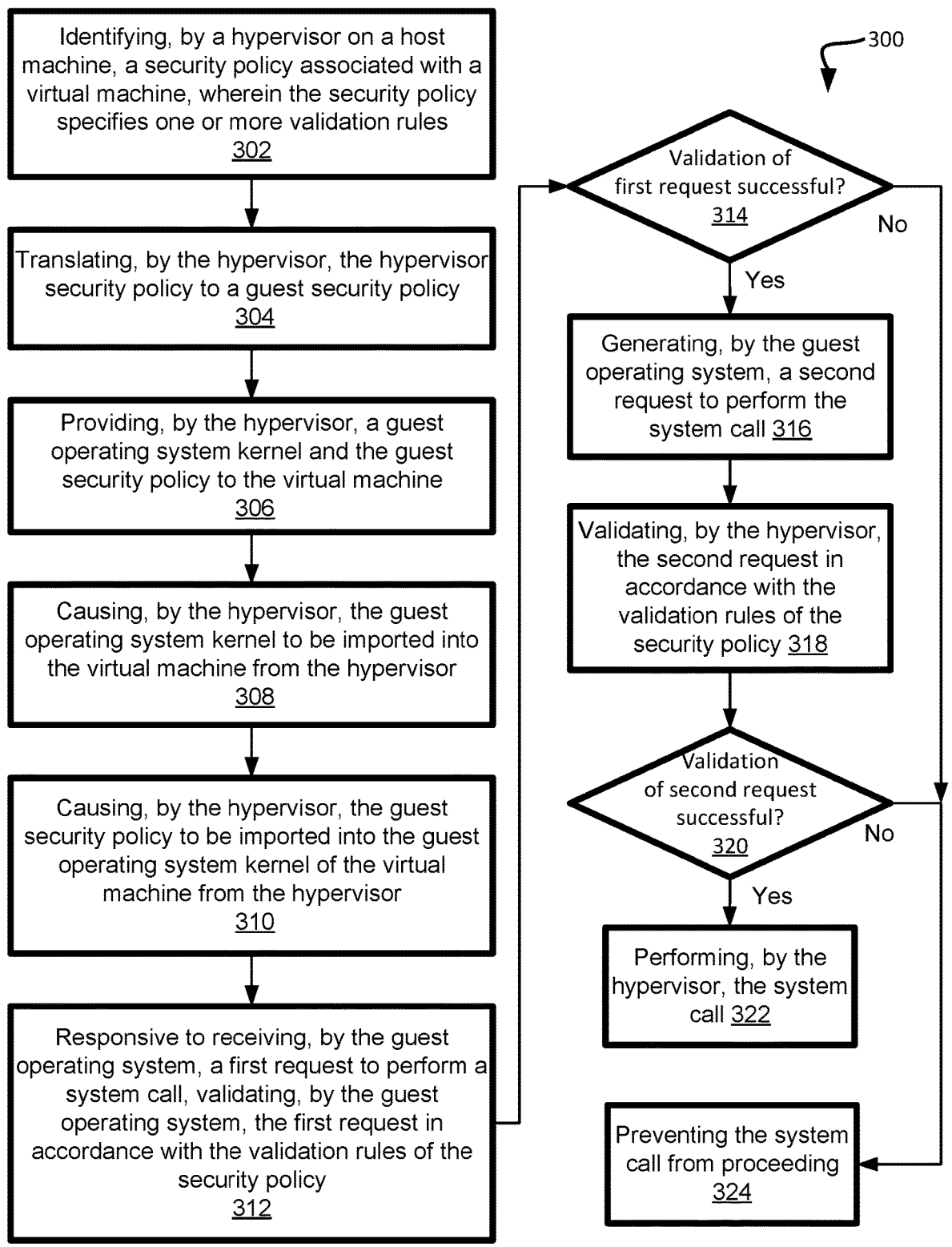
FIG. 3 depicts a flow diagram of an example method for validating system call invocations in a virtual machine using a guest security policy and in a hypervisor using a host security policy, in accordance with one or more aspects of the present disclosure.

FIG. 3 depicts a flow diagram of an example method 300 for validating system call invocations in a virtual machine using a guest security policy and in a hypervisor using a host security policy, in accordance with one or more aspects of the present disclosure. Method 300 and each of its individual functions, routines, subroutines, or operations may be performed by one or more processors of the computer device executing the method. In certain implementations, method 300 may be performed by a single processing thread. Alternatively, method 300 may be performed by two or more processing threads, each thread executing one or more individual functions, routines, subroutines, or operations of the method. In an illustrative example, the processing threads implementing method 300 may be synchronized (e.g., using semaphores, critical sections, and/or other thread synchronization mechanisms). Alternatively, the processes implementing method 300 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 300 may be performed by a kernel of a hypervisor as shown in FIG. 1 or by an executable code of a host machine (e.g., host operating system or firmware), a virtual machine (e.g., guest operating system or virtual firmware), an external device (e.g., a PCI device), other executable code, or a combination thereof.

Method 300 may be performed by processing devices of a server device or a client device and may begin at block 302. At block 302, a host computer system may identify, by a hypervisor on a host machine, a security policy associated with a virtual machine, wherein the security policy specifies one or more validation rules.

At block 304, the host computer system may translate, by the hypervisor, the hypervisor security policy to a guest security policy. At block 306, the host computer system may provide, by the hypervisor, a guest operating system kernel and the guest security policy to the virtual machine. At block 308, the host computer system may cause, by the hypervisor, the guest operating system kernel to be imported into the virtual machine from the hypervisor.

At block 310, the host computer system may cause, by the hypervisor, the guest security policy to be imported into the guest operating system kernel of the virtual machine from the hypervisor. At block 312, the host computer system may, responsive to receiving, by the guest operating system, a first request to perform a system call, validate, by the guest operating system, the first request in accordance with the validation rules of the security policy. At block 314, the host computer system may determine whether the validation of the first request is successful. If so, the host computer system may execute block 316. Otherwise, if the validation of the first request is not successful, the host computer system may execute block 324, which prevents the system call from proceeding. At block 316, the host computer system may generate, by the guest operating system, a second request to perform the system call. At block 318, the host computer system may validate, by the hypervisor, the second request in accordance with the validation rules of the security policy.

At block 320, the host computer system may determine whether the validation of the second request is successful. If so, the host computer system may execute block. Otherwise, if the validation of the second request is not successful, the host computer system may execute block 324, which prevents the system call from proceeding. At block 322, the host computer system may perform, by the hypervisor, the system call. The method may end after block 322 executes. At block 324, which may be executed if validation of the first or second request is not successful (as described above), host computer system may prevent the system call from proceeding. The method may end after block 324 executes.

Figure 4:
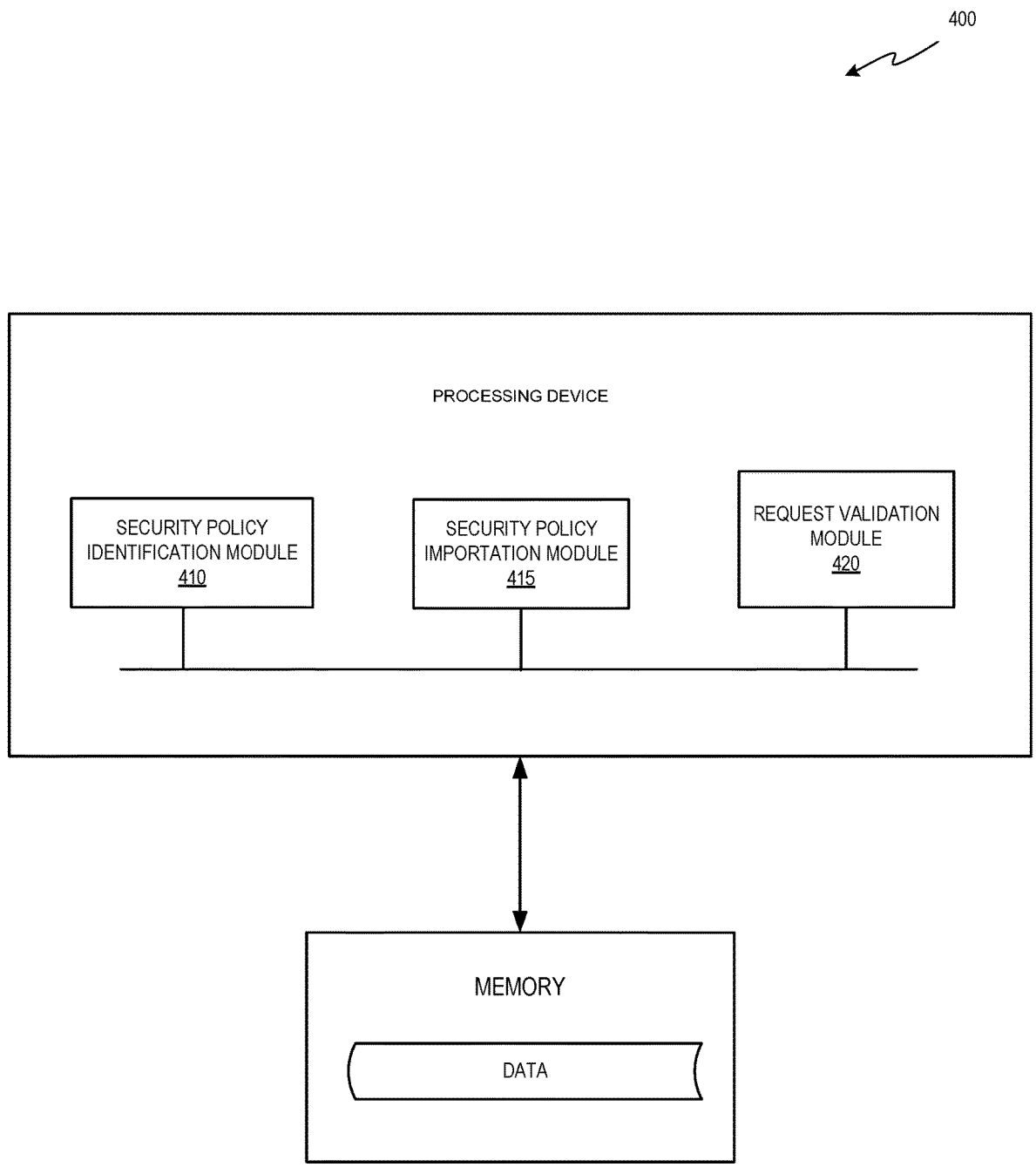
FIG. 4 depicts a block diagram of a computer system operating in accordance with one or more aspects of the present disclosure.

FIG. 4 depicts a block diagram of a computer system 400 operating in accordance with one or more aspects of the present disclosure. Computer system 400 may be the same or similar to computing device 100 of FIG. 1, and may include one or more processors and one or more memory devices. In the example shown, computer system 400 may include a security policy identification module 410, a security policy importation module 415, and a request validation module 420.

Security policy identification module 410 may enable a processor to identify, by a hypervisor on a host machine, a security policy associated with a virtual machine. The security policy may specify one or more validation rules. The validation rules of the security policy specify one or more of one or more allowed system calls, one or more allowed files, one or more allowed network addresses, or one or more allowed host devices.

Security policy importation module 415 may enable the processor to cause, by the hypervisor, the security policy to be imported into a guest operating system of the virtual machine from the hypervisor. Causing, by the hypervisor, the security policy to be imported into the virtual machine from the hypervisor may include storing, by the hypervisor, the security policy and instructions to enforce the policy in a virtual machine image, wherein the virtual machine is loaded from the virtual machine image.

Request validation module 420 may enable the processor to, responsive to receiving, by the guest operating system, a first request to perform a system call, validate, by the guest operating system, the first request in accordance with the validation rules of the security policy. Responsive to successfully validating, by the guest operating system, the first request in accordance with the validation rules of the security policy, the processor may allow the system call to proceed.

Figure 5:
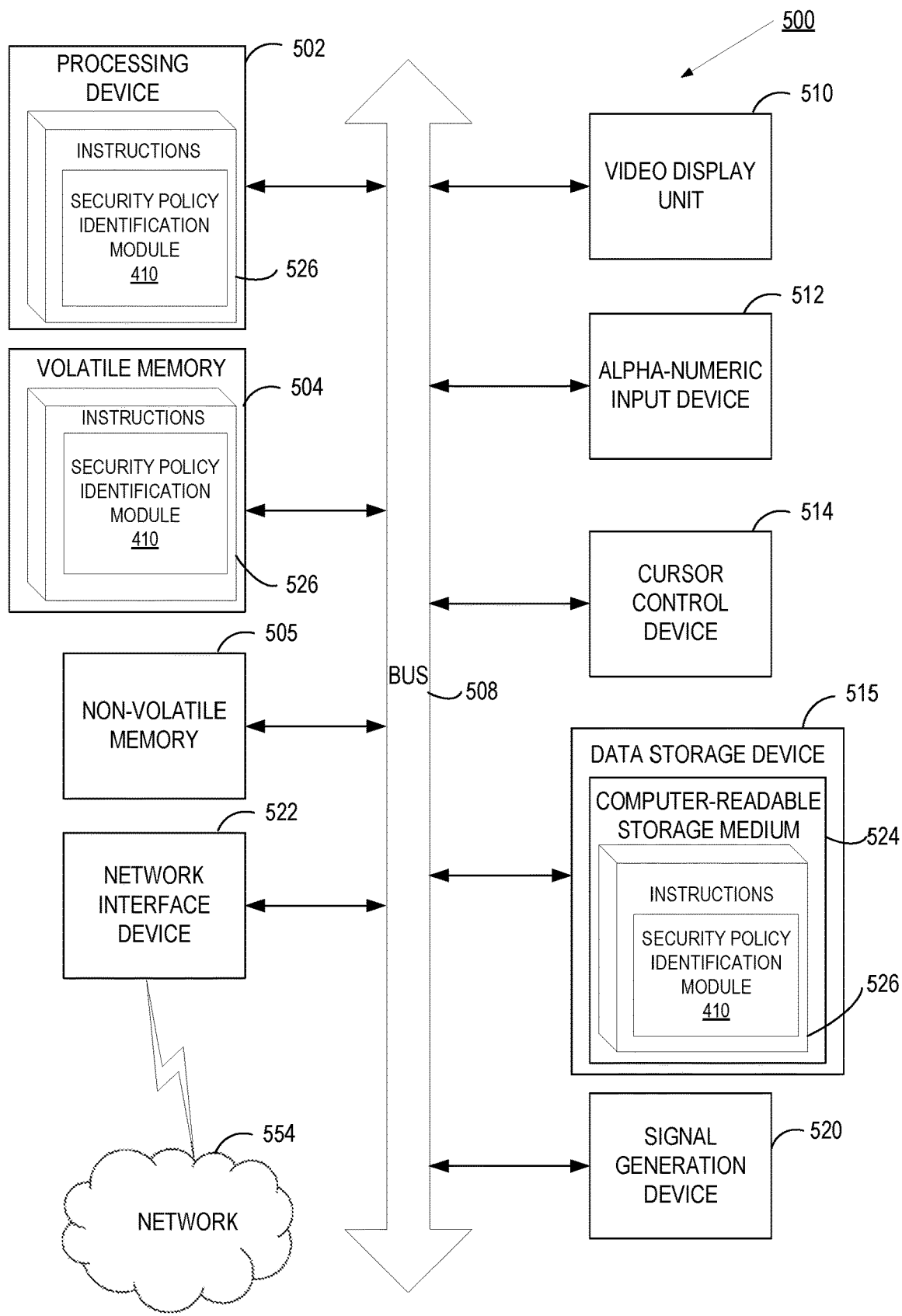
FIG. 5 depicts a block diagram of an example computer system operating in accordance with one or more aspects of the present disclosure.

FIG. 5 depicts a block diagram of a computer system operating in accordance with one or more aspects of the present disclosure. In various illustrative examples, computer system 500 may correspond to computing device 100 of FIG. 1. Computer system 500 may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical environment, but requests for a hard disk or memory may be managed by a virtualization layer of a computing device to translate these requests to the underlying physical computing hardware resources. This type of virtualization results in multiple VMs sharing physical resources.

In certain implementations, computer system 500 may be connected (e.g., via a network, such as a Local Area Network (LAN), an intranet, an extranet, or the Internet) to other computer systems. Computer system 500 may operate in the capacity of a server or a client computer in a client-server environment, or as a peer computer in a peer-to-peer or distributed network environment. Computer system 500 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 500 may include a processing device 502, a volatile memory 504 (e.g., random access memory (RAM)), a non-volatile memory 506 (e.g., read-only memory (ROM) or electrically-erasable programmable ROM (EEPROM)), and a data storage device 516, which may communicate with each other via a bus 508.

Processing device 502 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 500 may further include a network interface device 522. Computer system 500 also may include a video display unit 510 (e.g., an LCD), an alphanumeric input device 512 (e.g., a keyboard), a cursor control device 514 (e.g., a mouse), and a signal generation device 520.

Data storage device 516 may include a non-transitory computer-readable storage medium 524 on which may store instructions 526 encoding any one or more of the methods or functions described herein, including instructions for implementing method 200 or 300.

Instructions 526 may also reside, completely or partially, within volatile memory 504 and/or within processing device 502 during execution thereof by computer system 500, hence, volatile memory 504 and processing device 502 may also constitute machine-readable storage media.

While computer-readable storage medium 524 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

Other computer system designs and configurations may also be suitable to implement the system and methods described herein. The following examples illustrate various implementations in accordance with one or more aspects of the present disclosure.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "determining," "deriving," "encrypting," "creating," "generating," "using," "accessing," "executing," "obtaining," "storing," "transmitting," "providing," "establishing," "receiving," "identifying," "initiating," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform method 200 or 300 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
   identifying, by a hypervisor on a host machine, a security policy associated with a virtual machine, wherein the security policy specifies one or more validation rules;
   causing, by the hypervisor, the security policy to be imported into a guest operating system of the virtual machine via a virtual device, by storing, by the hypervisor, the security policy and instructions to enforce the policy in a virtual machine image from which the virtual machine is loaded; and responsive to receiving, by the guest operating system, a first request to perform a system call, validating, by the guest operating system, the first request in accordance with the validation rules of the security policy.

2. The method of claim 1, further comprising:
responsive to successfully validating, by the guest operating system, the first request in accordance with the validation rules of the security policy, allowing the system call to proceed.

3. The method of claim 2, wherein the validation rules of the security policy specify one or more of:
one or more allowed system calls,
one or more allowed files,
one or more allowed network addresses, or
one or more allowed host devices.

4. The method of claim 3, wherein successfully validating, by the guest operating system, the first request in accordance with the validation rules of the security policy comprises:
determining, by the guest operating system, that the requested system call corresponds to at least one of the allowed system calls.

5. The method of claim 3, further comprising:
translating, by the hypervisor, the security policy to a guest security policy that specifies one or more allowed guest devices, wherein the translating comprises mapping the one or more allowed host devices to the one or more allowed guest devices.

6. The method of claim 5, wherein the allowed host devices comprise physical devices associated with the host, and the allowed guest devices comprise virtual devices in the guest operating system that correspond to the physical devices.

7. The method of claim 5, wherein successfully validating, by the guest operating system, the first request in accordance with the validation rules of the security policy comprises:
determining, by the guest operating system, that a guest device associated with the requested system call is included in the allowed guest devices.

8. The method of claim 1, further comprising:
responsive to successfully validating, by the guest operating system, the first request to perform the system call, generating, by the guest operating system, a second request to perform the system call; and
responsive to receiving, by the hypervisor, the second request to perform the system call, validating, by the hypervisor, the second request in accordance with the validation rules of the security policy.

9. The method of claim 8, further comprising:
responsive to successfully validating, by the hypervisor, the second request, performing, by the hypervisor, the system call.

10. The method of claim 1, further comprising:
responsive to not successfully validating, by the guest operating system, the first request in accordance with the validation rules of the security policy, preventing, by the guest operating system, the system call from proceeding.

11. The method of claim 10, wherein preventing the system call from proceeding comprises one or more of:
discarding the request,
terminating a process that generated the request, or
generating an error indication.

12. The method of claim 1, wherein the guest operating system comprises a guest operating system kernel, the method further comprising:

providing, by the hypervisor, the guest operating system kernel to the virtual machine, wherein validating, by the guest operating system, the first request in accordance with the validation rules of the security policy is performed by the guest operating system kernel.

13. The method of claim 12, wherein providing, by the hypervisor, the guest operating system kernel to the virtual machine comprises:
storing, by the hypervisor, the guest operating system kernel in a memory region, wherein the virtual machine accesses the guest operating system kernel in the memory region.

14. A system comprising:
a memory; and
a processor communicably coupled to the memory, the processor to:
identify, by a hypervisor, a security policy associated with a virtual machine, wherein the security policy specifies one or more validation rules;
cause, by the hypervisor, the security policy to be imported into a guest operating system of the virtual machine via a virtual device, by storing, by the hypervisor, the security policy and instructions to enforce the policy in a virtual machine image from which the virtual machine is loaded; and
responsive to receiving, by the guest operating system, a first request to perform a system call, validate, by the guest operating system, the first request in accordance with the validation rules of the security policy.

15. The system of claim 14, wherein the processor is further to:
responsive to successfully validating, by the guest operating system, the first request in accordance with the validation rules of the security policy, allow the system call to proceed.

16. The system of claim 15, wherein the validation rules of the security policy specify one or more of:
one or more allowed system calls,
one or more allowed files,
one or more allowed network addresses, or
one or more allowed host devices.

17. A non-transitory machine-readable storage medium storing instructions which, when executed, cause a processor to perform operations comprising:
identifying, by a hypervisor, a security policy associated with a virtual machine, wherein the security policy specifies one or more validation rules;
causing, by the hypervisor, the security policy to be imported into a guest operating system of the virtual machine via a virtual device by storing, by the hypervisor, the security policy and instructions to enforce the policy in a virtual machine image from which the virtual machine is loaded; and
responsive to receiving, by the guest operating system, a first request to perform a system call, validating, by the guest operating system, the first request in accordance with the validation rules of the security policy.

18. The non-transitory machine-readable storage medium of claim 17, the operations further comprising:
responsive to successfully validating, by the guest operating system, the first request in accordance with the validation rules of the security policy, allowing the system call to proceed.

* * * * *